(12) United States Patent
Stewart et al.

(10) Patent No.: US 10,723,486 B2
(45) Date of Patent: Jul. 28, 2020

(54) METHODS OF USING POSITIONING FIXTURES

(71) Applicant: The Boeing Company, Chicago, IL (US)

(72) Inventors: Matthew Jameson Stewart, Seattle, WA (US); Alan D. Erickson, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 16/113,849

(22) Filed: Aug. 27, 2018

(65) Prior Publication Data

US 2019/0009930 A1 Jan. 10, 2019

Related U.S. Application Data

(62) Division of application No. 14/290,146, filed on May 29, 2014, now Pat. No. 10,124,913.

(51) Int. Cl.
*B64F 5/10* (2017.01)

(52) U.S. Cl.
CPC ........... *B64F 5/10* (2017.01); *Y10T 29/49618* (2015.01); *Y10T 29/53983* (2015.01); *Y10T 156/10* (2015.01)

(58) Field of Classification Search
CPC ............. B64F 5/0009; Y10T 29/53983; Y10T 156/10; Y10T 29/49618; Y10T 29/50
See application file for complete search history.

(56) References Cited

U.S. PATENT DOCUMENTS

| 2,375,513 | A | * | 5/1945 | Bach | F16L 3/221 248/59 |
|---|---|---|---|---|---|
| 3,599,921 | A | * | 8/1971 | Cumber | E04B 9/006 248/317 |
| 3,612,461 | A | * | 10/1971 | Brown | E04B 9/18 248/317 |
| 3,652,780 | A | * | 3/1972 | Wilson | H01B 17/145 174/45 R |
| 4,399,642 | A | | 8/1983 | Bard et al. | |

(Continued)

OTHER PUBLICATIONS

"U.S. Appl. No. 14/290,146, Advisory Action dated Sep. 7, 2016", 3 pgs.

(Continued)

*Primary Examiner* — Rick K Chang
(74) *Attorney, Agent, or Firm* — Kwan & Olynick LLP

(57) ABSTRACT

A method of assembling a structure using a fixture is disclosed. The fixture comprises a first portion and a second portion, and the structure comprises an object and a beam that includes a web. The method comprises installing the fixture on the beam by gripping the beam between a first clamping face of the first portion and a second clamping face of the second portion so that a first contact face of the first portion and a second contact face of the second portion abut each other, and the first clamping face and the second clamping face engage the web; positioning the object relative to the beam between a first positioning face of the first portion and a second positioning face of the second portion without gripping the object; and installing a fastener so that the first portion is drawn toward the second portion.

20 Claims, 12 Drawing Sheets

(56) References Cited

U.S. PATENT DOCUMENTS

| | | | | |
|---|---|---|---|---|
| 5,292,227 A * | 3/1994 | Czachor | ............... | F01D 25/162 |
| | | | | 415/142 |
| 5,491,943 A * | 2/1996 | Vondrejs | ............... | E04B 2/7425 |
| | | | | 52/239 |
| 5,533,696 A * | 7/1996 | Laughlin | ............... | F16L 3/12 |
| | | | | 248/74.1 |
| 6,345,800 B1 * | 2/2002 | Herst | ............... | E04B 9/006 |
| | | | | 248/342 |
| 7,182,291 B2 | 2/2007 | Westre et al. | | |
| 7,374,057 B2 * | 5/2008 | Hendrickson | ............ | H02G 3/20 |
| | | | | 174/50 |
| 7,938,362 B2 | 5/2011 | Kismarton et al. | | |
| 8,205,312 B2 * | 6/2012 | Simmons | ............... | B23K 31/12 |
| | | | | 29/281.1 |
| 8,240,606 B2 | 8/2012 | Westre et al. | | |
| 8,328,071 B2 * | 12/2012 | LaValley | ............... | B26D 3/16 |
| | | | | 228/49.3 |
| 8,360,362 B2 | 1/2013 | Kismarton et al. | | |
| 8,500,079 B2 * | 8/2013 | Oh | ............... | E04B 9/006 |
| | | | | 248/343 |
| 8,568,002 B2 * | 10/2013 | Howe | ............... | G02B 5/0284 |
| | | | | 362/330 |
| 8,590,769 B2 * | 11/2013 | LaValley | ............... | B26D 3/16 |
| | | | | 228/212 |
| 8,875,401 B2 * | 11/2014 | Jolley | ............... | B23P 19/04 |
| | | | | 29/897.312 |
| 8,986,021 B2 * | 3/2015 | Keswani | ............... | H01R 25/142 |
| | | | | 439/110 |
| 9,255,402 B2 * | 2/2016 | Sareyka | ............... | E04B 9/127 |
| 10,124,913 B2 | 11/2018 | Stewart et al. | | |
| 2015/0308617 A1 * | 10/2015 | Sareyka | ............... | E04B 9/068 |
| | | | | 52/506.07 |

OTHER PUBLICATIONS

"U.S. Appl. No. 14/290,146, Examiner's Answer to Appeal Brief dated Mar. 27, 2017", 8 pages.

"U.S. Appl. No. 14/290,146, Final Office Action dated Aug. 2, 2016", 8 pgs.

"U.S. Appl. No. 14/290,146, Non Final Office Action dated Mar. 25, 2016", 8 pgs.

"U.S. Appl. No. 14/290,146, Notice of Allowance dated Aug. 2, 2018", 5 pages.

"U.S. Appl. No. 14/290,146, Restriction Requirement dated Feb. 19, 2016", 6 pgs.

"Skyflex Aircraft Sealant, Airbus A320 Aircraft Family Installation Guide", W.L. Gore & Associates, Inc., Elkton, Maryland, USA, 8 pgs.

* cited by examiner

METHODS OF USING POSITIONING FIXTURES

CROSS-REFERENCE TO RELATED APPLICATIONS

This application is a divisional of and claims priority to U.S. patent application Ser. No. 14/290,146, entitled: "POSITIONING FIXTURE AND METHOD OF USING THE FIXTURE", filed on May 29, 2014, which is incorporated herein by reference in its entirety for all purposes.

BACKGROUND

When assembling structures, such as aircraft, it may be necessary to bond an object, such as a spacer, to a beam. If assembly is halted to accommodate bonding operations, manufacturing lead time may increase. If assembly continues during the bonding operations, the object may be inadvertently displaced from its intended location on the beam and/or damaged, thereby potentially necessitating costly rework and creating objectionable delays.

SUMMARY

Accordingly, apparatuses and methods intended to address the above-identified concerns, could find utility.

One example of the present disclosure relates to a fixture for positioning an object relative to a beam, wherein the beam includes a web. The fixture includes a first portion including a first positioning face, a first contact face, and a first clamping face. Each of the first positioning face, the first contact face, and the first clamping face is movable in a first working direction. The fixture also includes a second portion including a second positioning face, a second contact face, and a second clamping face. Each of the second positioning face, the second contact face, and the second clamping face is movable in a second working direction opposite to the first working direction. When the fixture is installed on the beam, the first contact face and the second contact face abut each other, and the first clamping face and the second clamping face engage the web.

One example of the present disclosure relates to a method of assembling a structure using a fixture comprising a first portion and a second portion. The structure includes an object and a beam that further includes a web. The method includes installing the fixture on the beam by gripping the beam between a first clamping face of the first portion and a second clamping face of the second portion, and positioning the object relative to the beam between a first positioning face of the first portion and a second positioning face of the second portion without gripping the object.

BRIEF DESCRIPTION OF THE DRAWINGS

Figure 1:
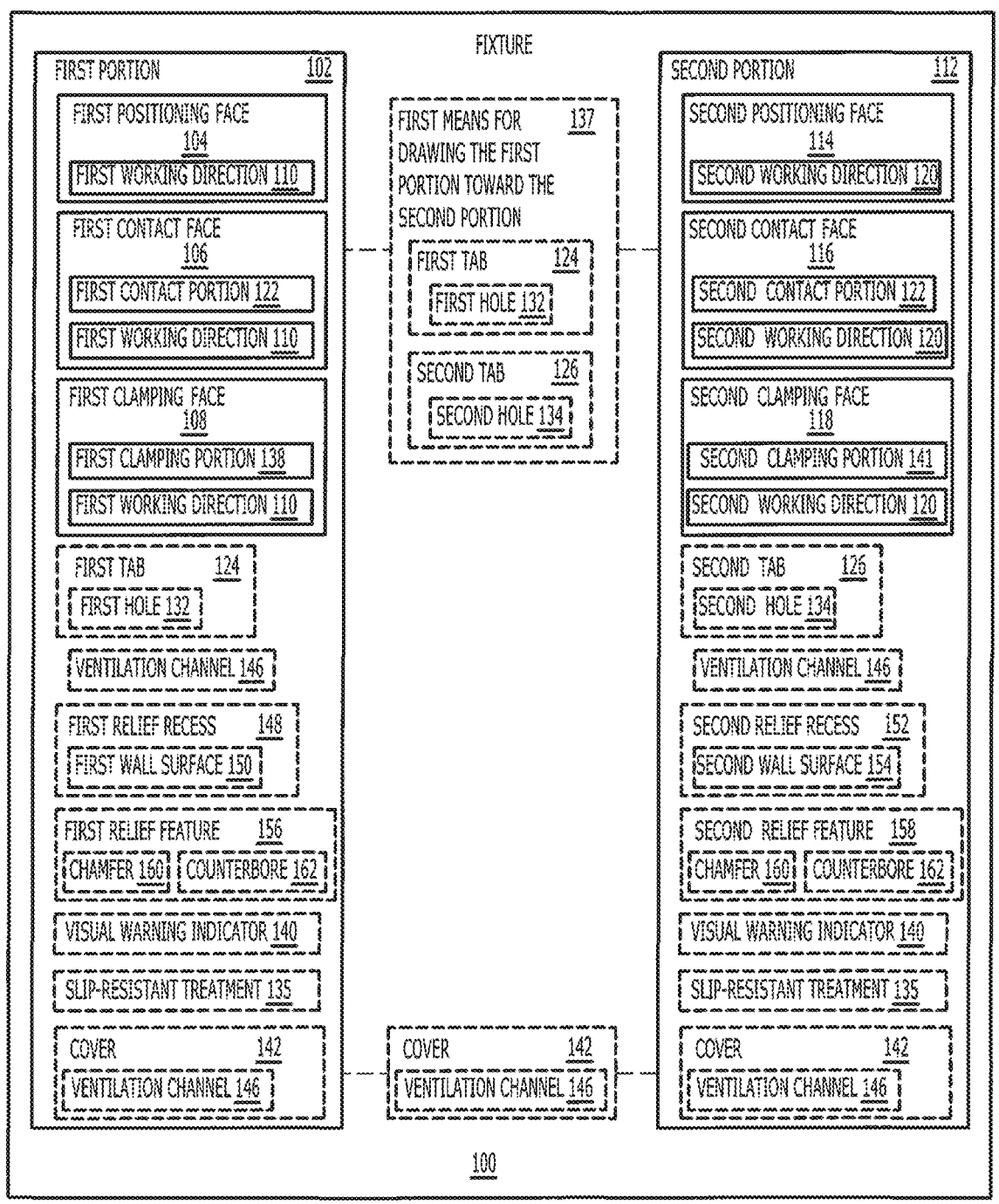
Figure 2:
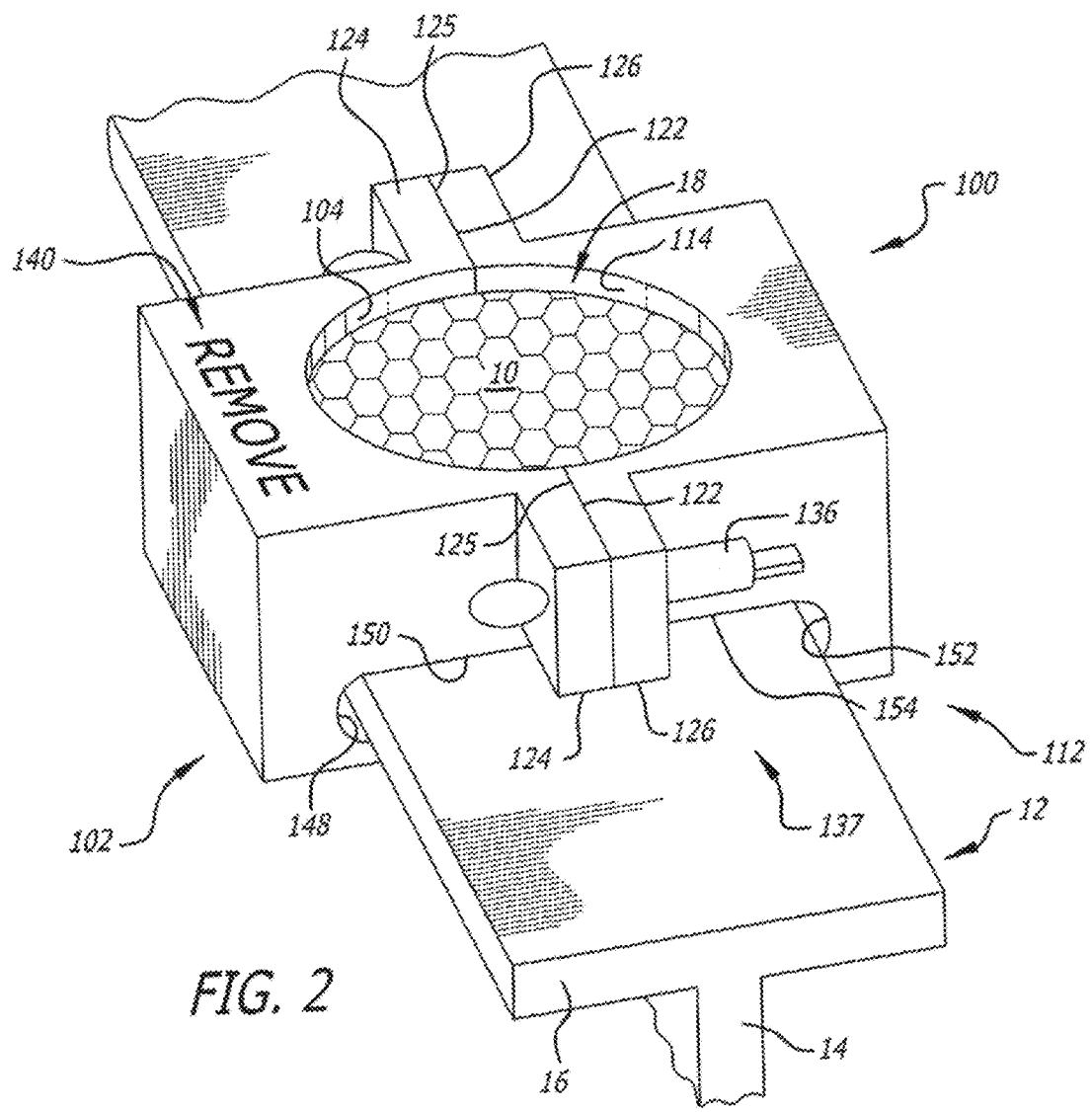
Figure 3:
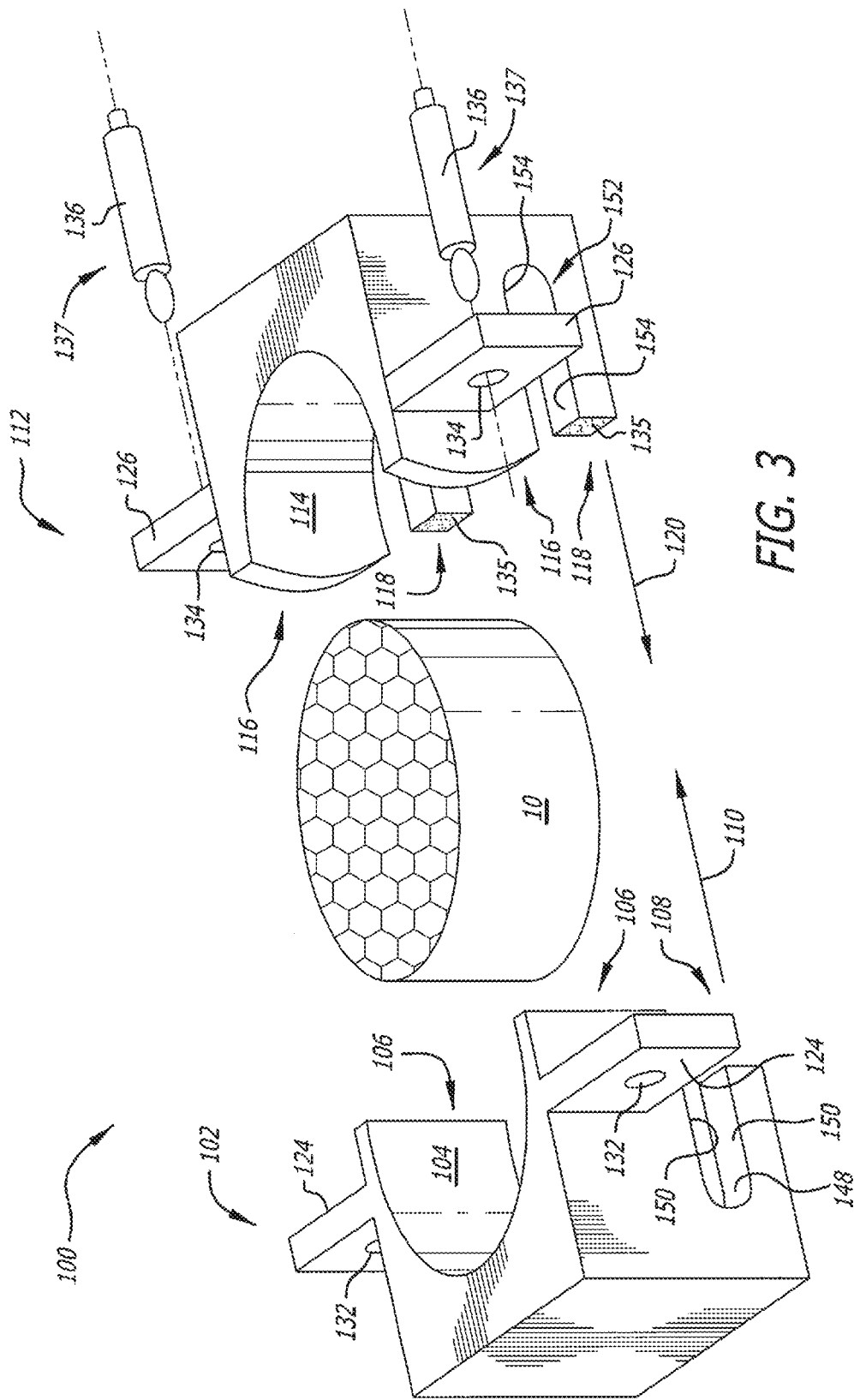
Figure 4:
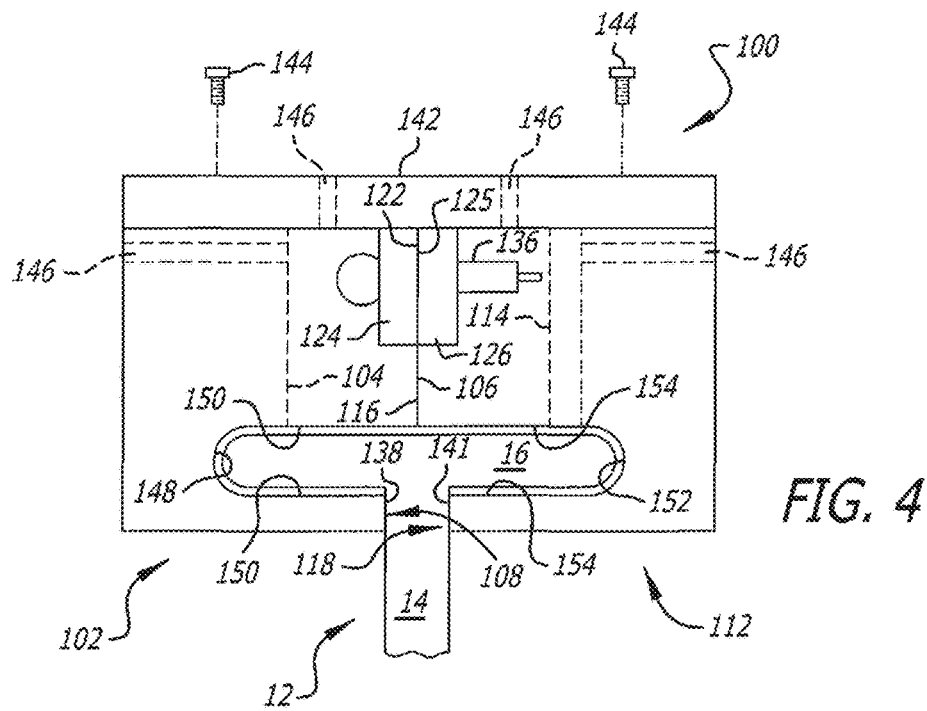
Figure 6:
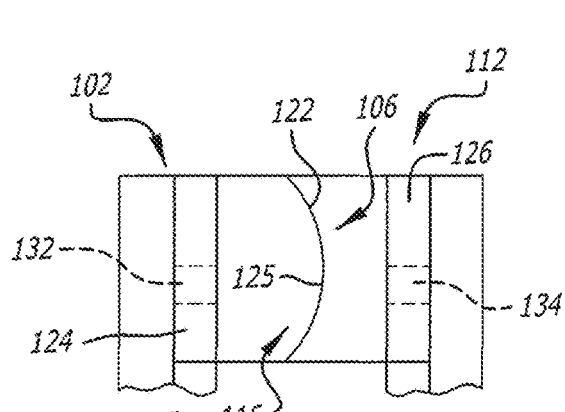
Figure 5:
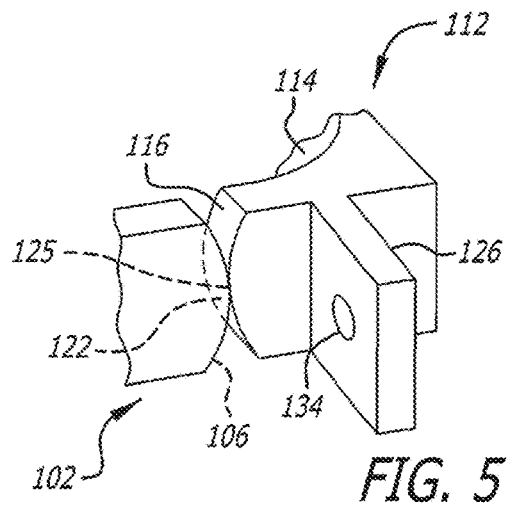
Figure 7:
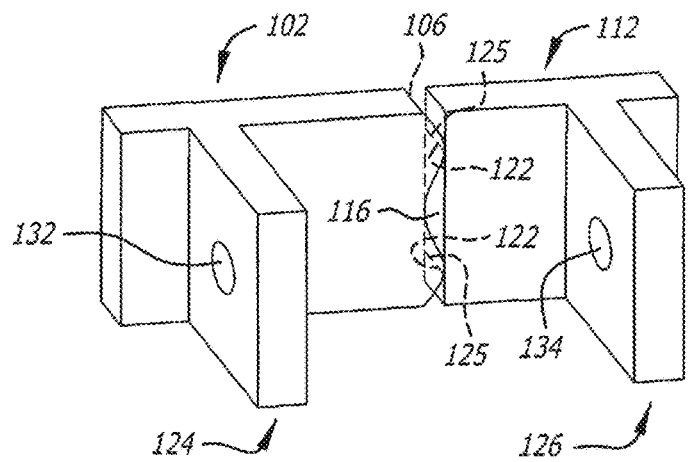
Figure 8:
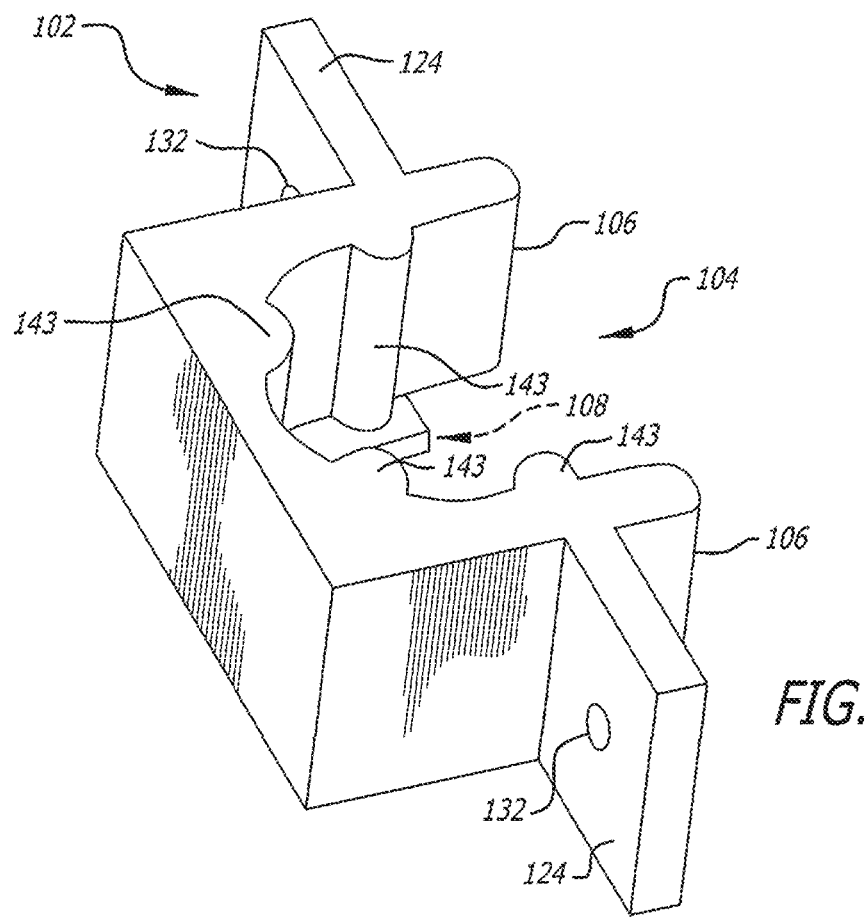
Figure 9:
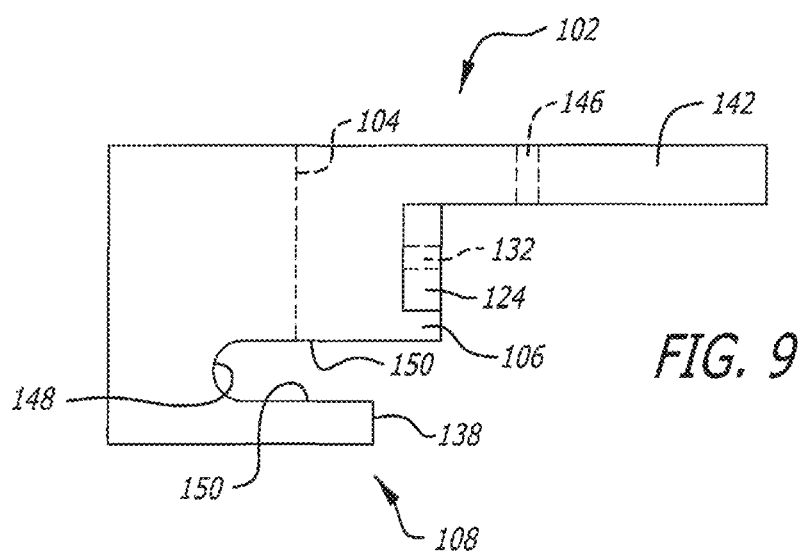
Figure 10:
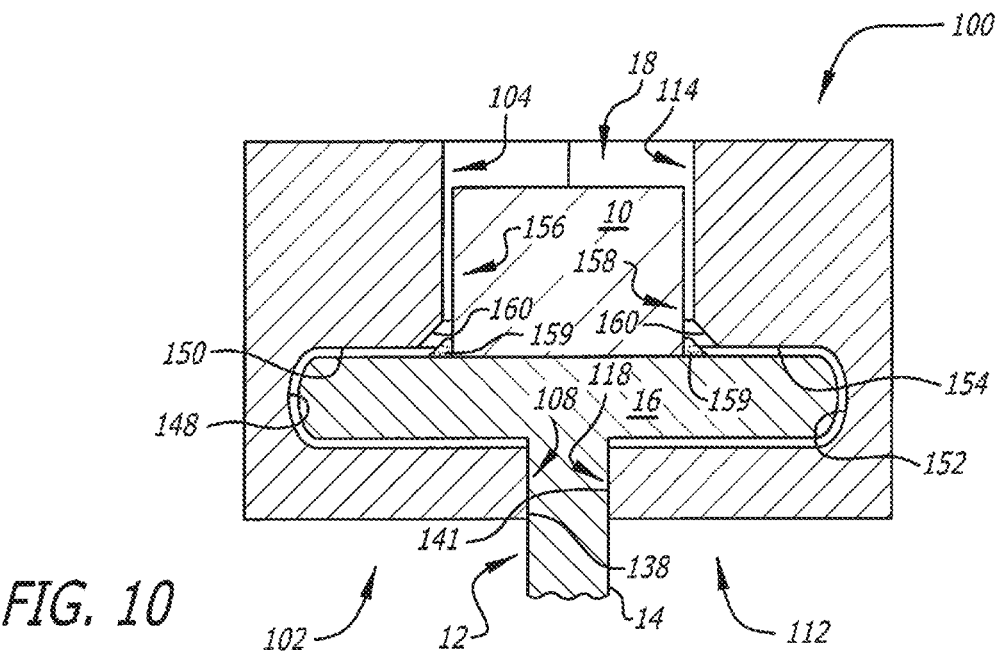
Figure 11:
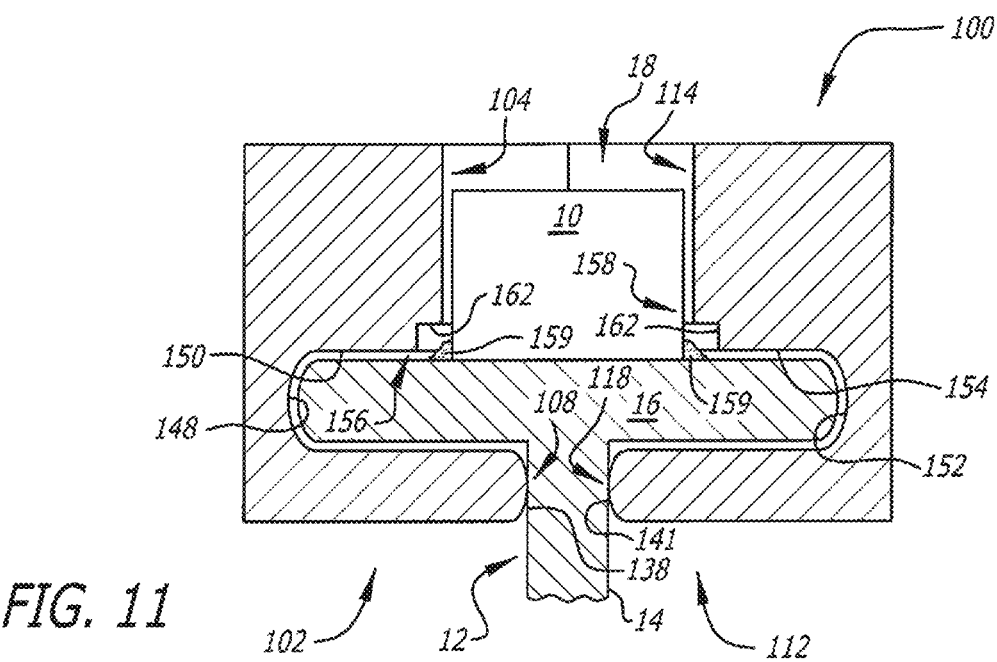
Figure 12:
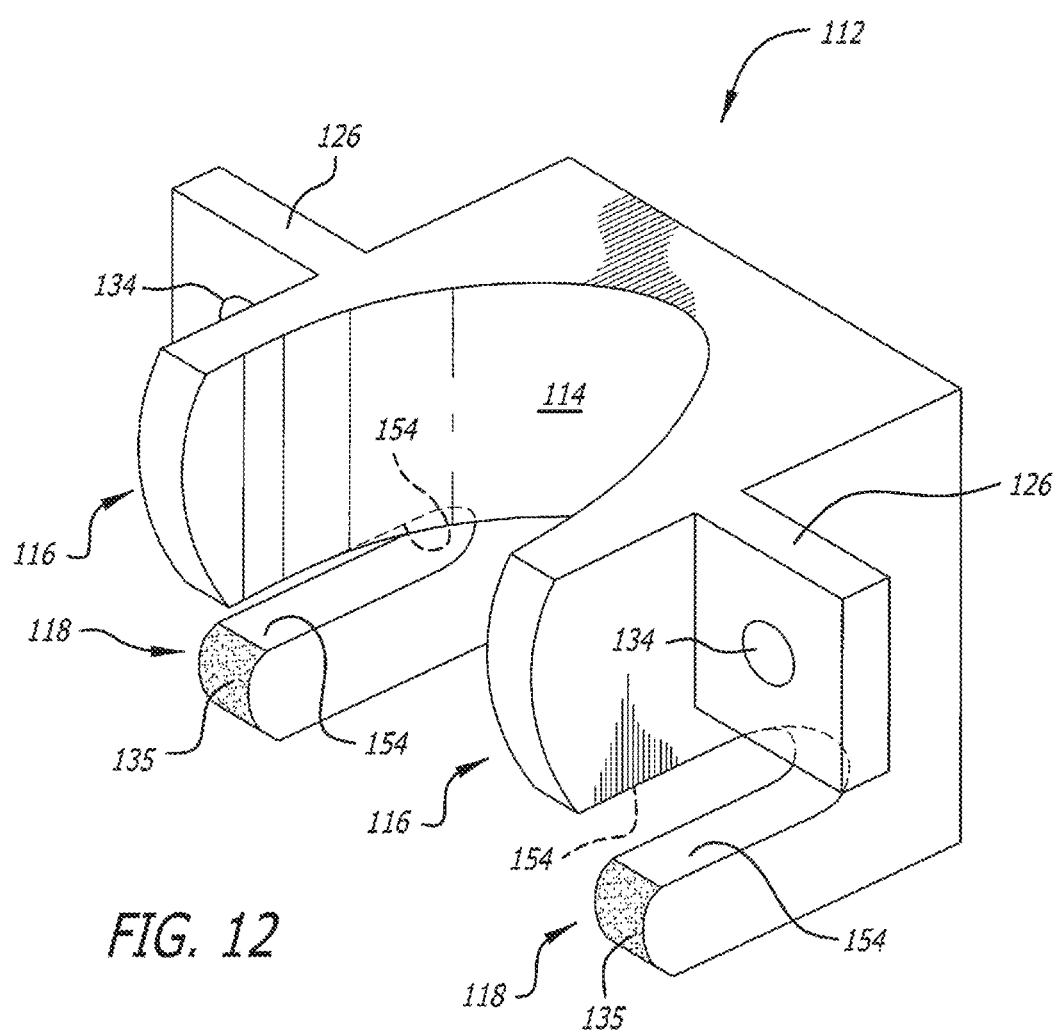
Figure 13:
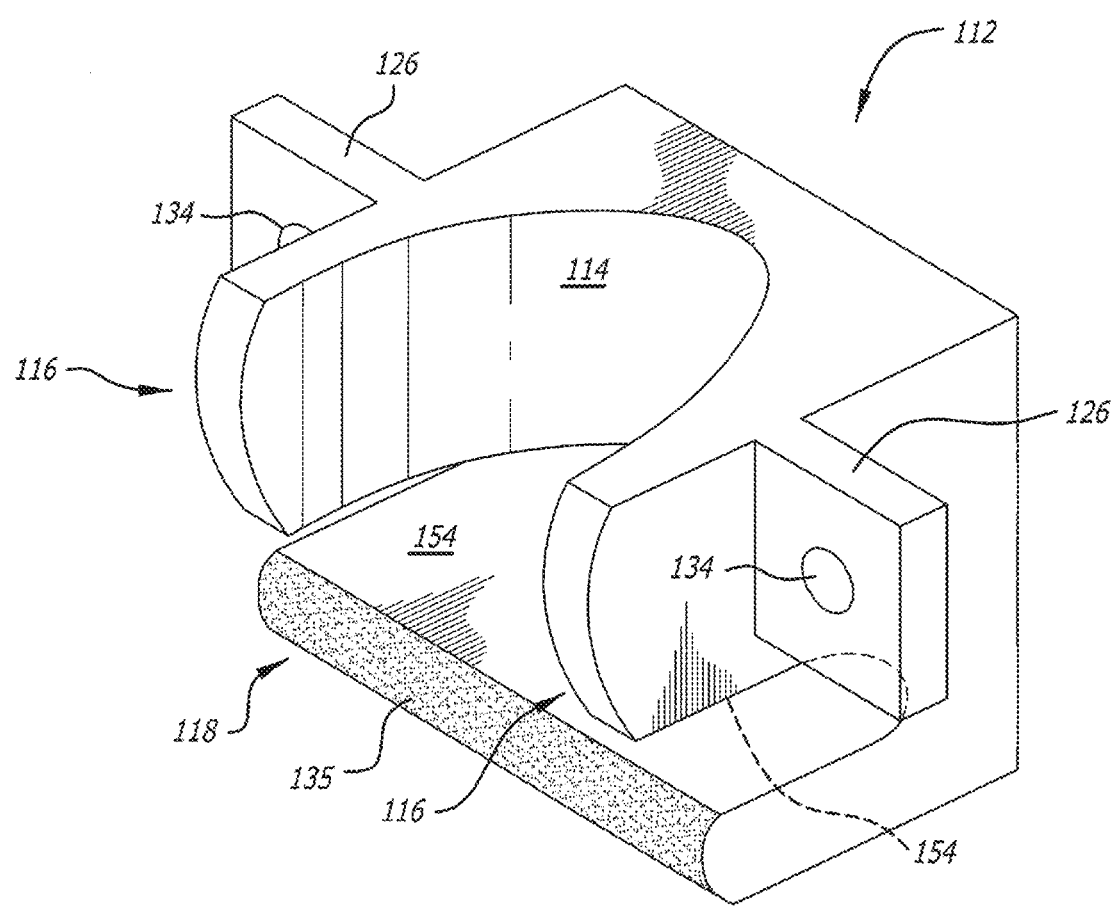
Figure 14:
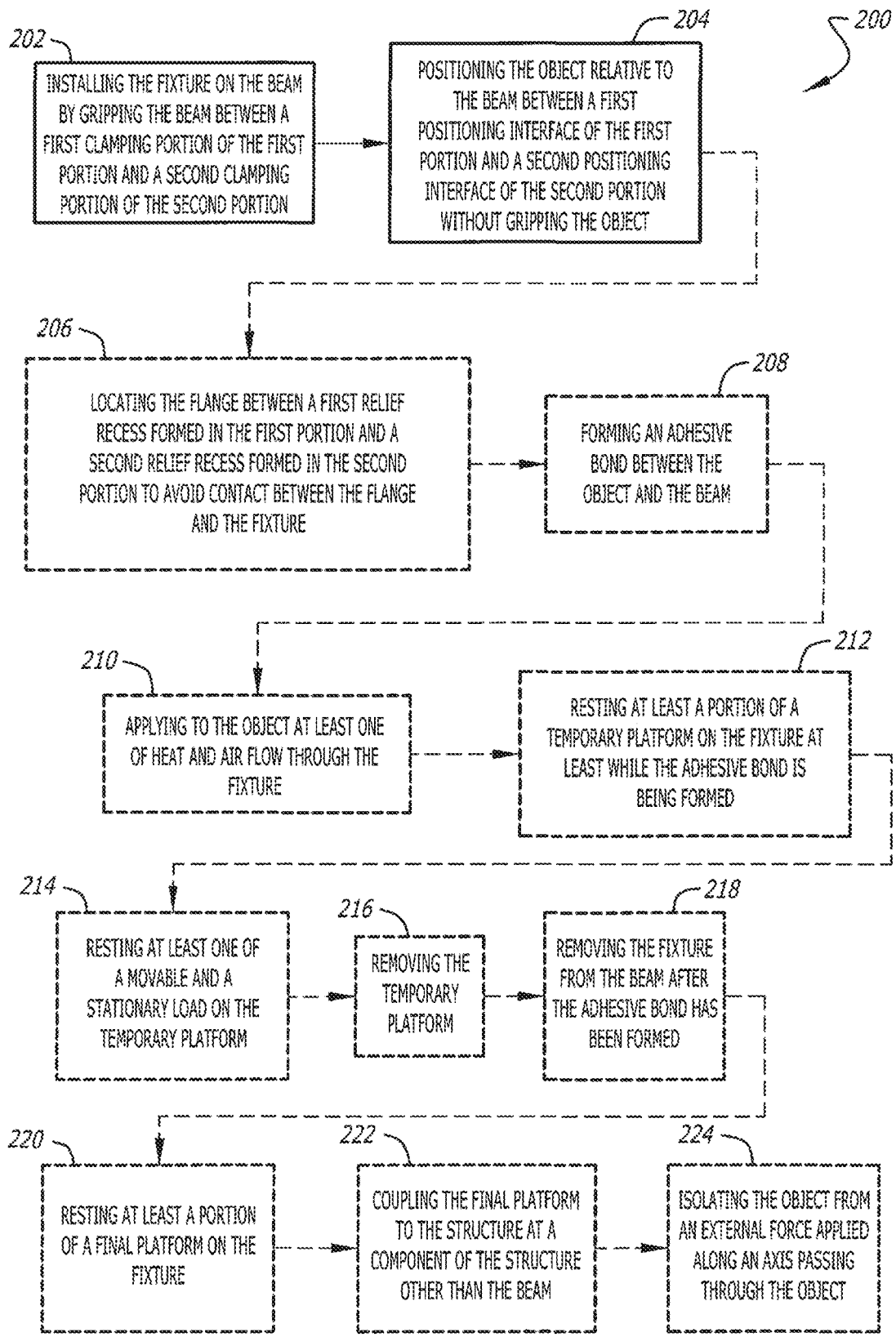
Figure 15:
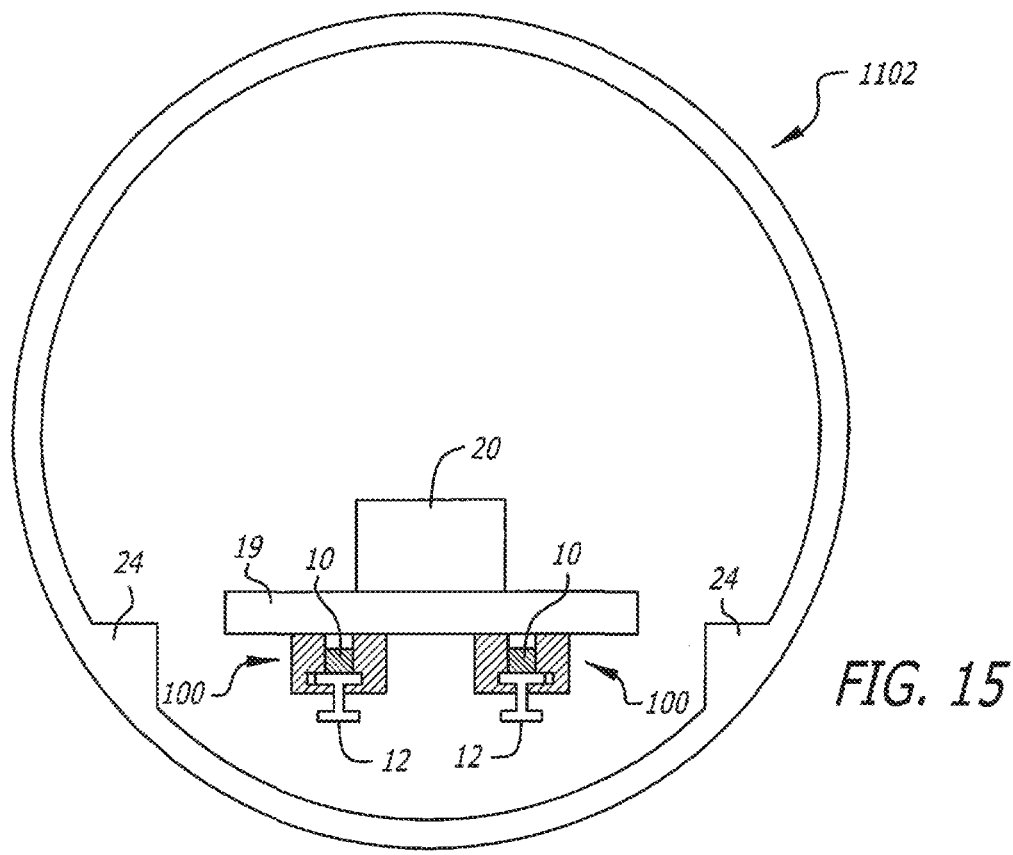
Figure 16:
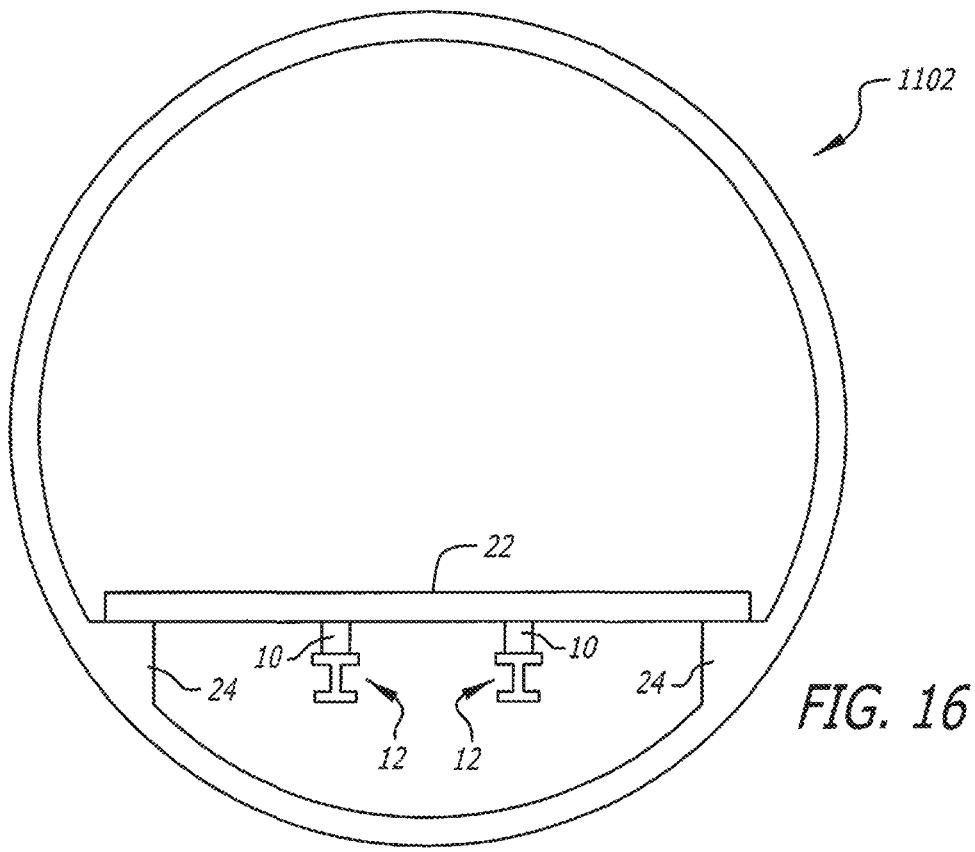
Figure 17:
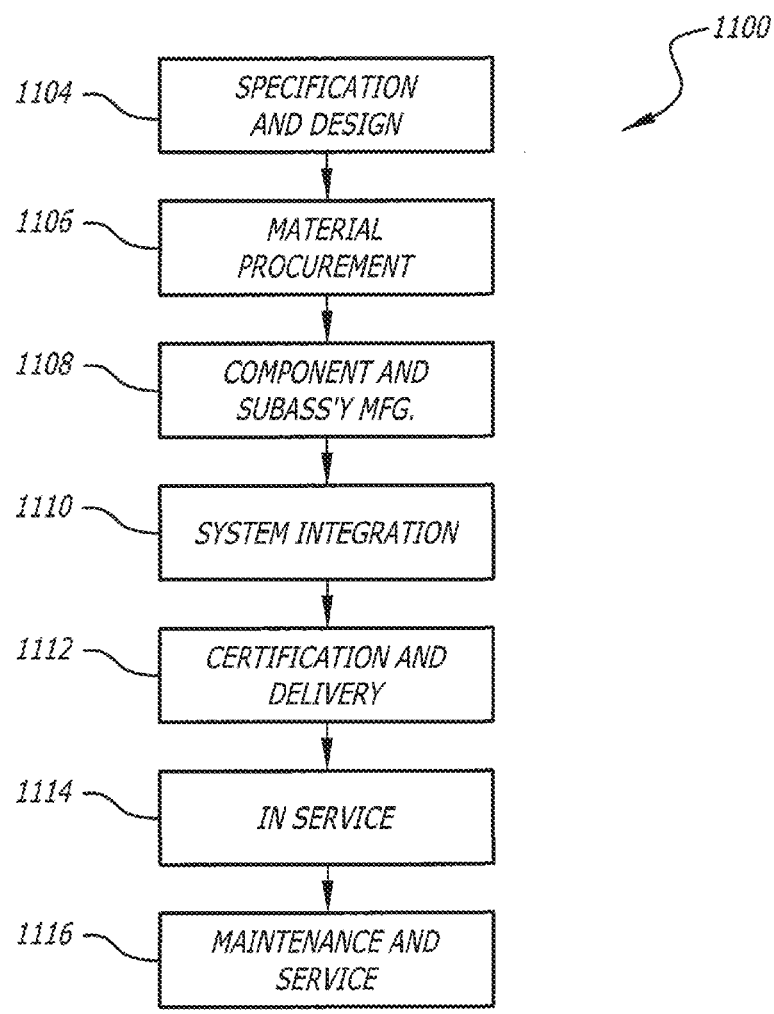
Figure 18:
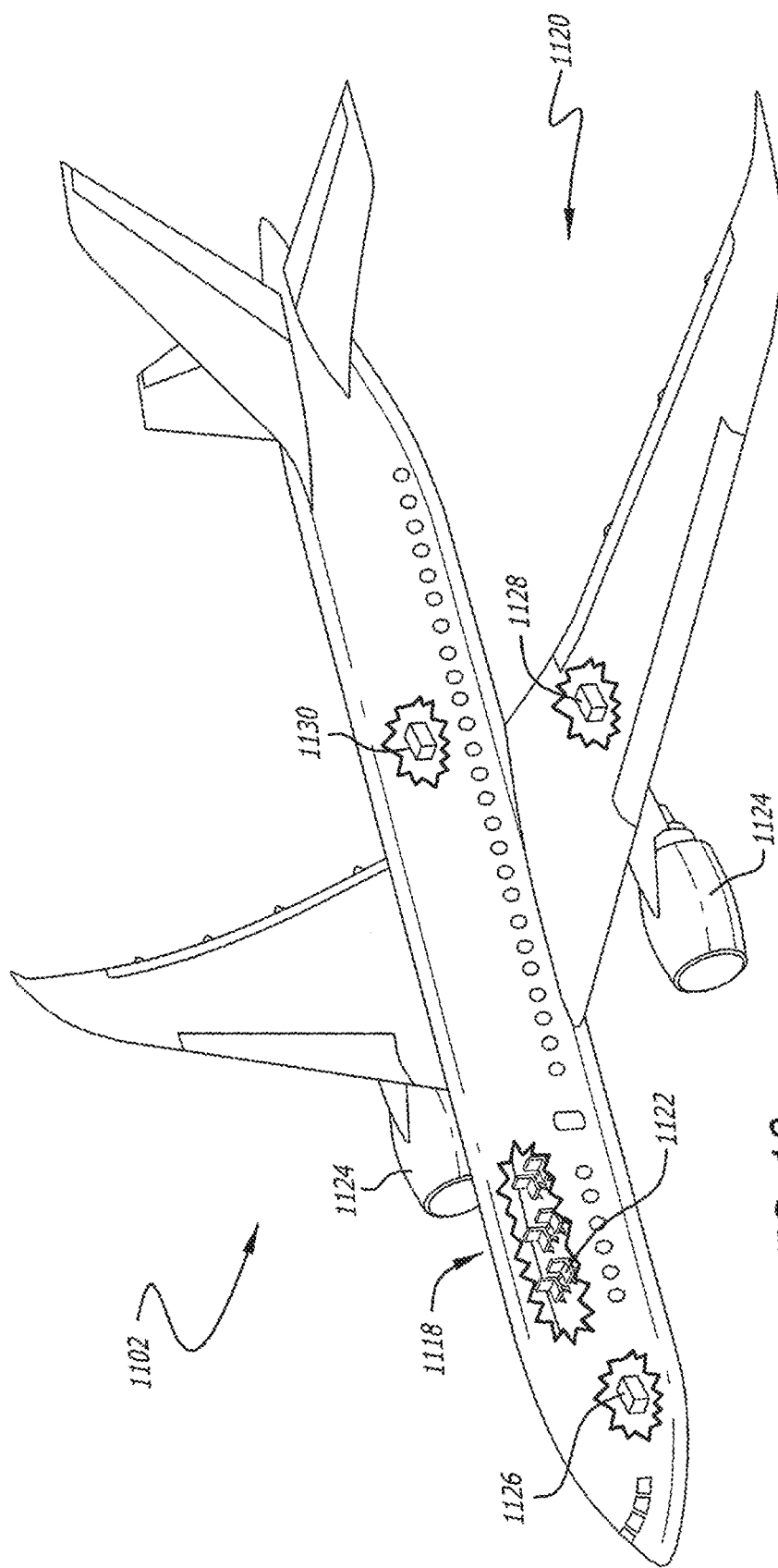

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a fixture for positioning an object relative to a beam;

FIG. 2 is a schematic environmental perspective view of the fixture of FIG. 1, the view including the object and the beam, according to at least one aspect of the disclosure;

FIG. 3 is a schematic exploded view of the fixture of FIG. 1, with the beam omitted, according to another aspect of the invention;

FIG. 4 is a schematic environmental side view of the fixture of FIG. 1, according to a further aspect of the disclosure;

FIG. 5 is a schematic perspective detail view of two portions of the fixture of FIG. 1, according to still another aspect of the disclosure;

FIG. 6 is a schematic perspective detail view of two portions of the fixture of FIG. 1, according to yet another aspect of the disclosure;

FIG. 7 is a schematic perspective detail view of two portions of the fixture of FIG. 1, according to one aspect of the disclosure;

FIG. 8 is a schematic perspective detail view of a first portion of the fixture of FIG. 1, according to still another aspect of the disclosure;

FIG. 9 is a schematic side detail view of a first portion of the fixture of FIG. 1, according to still a further aspect of the disclosure;

FIG. 10 is a schematic cross sectional detail view of the fixture of FIG. 1, according to yet a further aspect of the disclosure;

FIG. 11 is a schematic cross sectional detail view of the fixture of FIG. 1, according to another aspect of the disclosure;

FIG. 12 is a schematic perspective detail view of a portion of the fixture of FIG. 1, according to still another aspect of the disclosure;

FIG. 13 is a schematic perspective detail view of a portion of the fixture of FIG. 1, according to yet a further aspect of the disclosure;

FIG. 14 is a block diagram of a method of assembling a structure using a fixture, such as the fixture of FIG. 1, according to one aspect of the disclosure;

FIG. 15 is a sectional view of an aircraft illustrated in FIG. 18, with the fixture of FIG. 1 installed therein;

FIG. 16 is a sectional view of the aircraft of FIG. 15, with the fixture removed therefrom;

FIG. 17 is a block diagram of aircraft production and service methodology; and

FIG. 18 is a schematic perspective illustration of the aircraft shown in FIG. 16.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring generally to FIGS. 1-4, one example of the present disclosure relates to a fixture 100 for positioning an object 10 relative to a beam 12, wherein the beam 12 includes a web 14. The fixture 100 includes a first portion 102 including a first positioning face 104, a first contact face 106, and a first clamping face 108. Each of the first positioning face 104, the first contact face 106, and the first clamping face 108 is movable in a first working direction 110. The fixture 100 also includes a second portion 112 including a second positioning face 114, a second contact face 116, and a second clamping face 118. Each of the second positioning face 114, the second contact face 116, and the second clamping face 118 is movable in a second working direction 120 opposite to the first working direction 110. When the fixture 100 is installed on the beam 12, the first contact face 106 and the second contact face 116 abut each other, and the first clamping face 108 and the second clamping face 118 engage the web 14.

The first and second positioning faces 104, 114 include surfaces which need not necessarily contact or squeeze the object 10, but constrain the object 10 against lateral displacement along an upper surface of the beam 12, thereby preserving a selected position of the object 10 relative to the beam 12. In the example of FIG. 3, the first and second positioning faces 104, 114 are each semi-cylindrical, and are mirror images of one another.

The first and second contact faces 106, 116, stabilize the first and second portions 102, 112 of the fixture 100 when the fixture 100 is installed on the beam 12, as illustrated in FIG. 2. In this context, stabilizing the first and second portions 102, 112 means that the first and second portions 102, 112 will not be able to spontaneously or inadvertently teeter or pivot relative to the other. Alternatively stated, the first and second portions 102, 112 will maintain solid abutting contact with one another, so that the object 10 remains surrounded and constrained against lateral displacement along the beam 12. FIGS. 2 and 4 illustrate solid abutting contact. Abutting contact occurs when the first and second portions 102, 112 are moved in their respective working directions 110, 120 to the point of mutual contact. It should be noted that the first and second clamping faces 108, 118 not only clamp the fixture 100 to the web 14 when the first and second portions 102, 112 are drawn together to pinch the web 14, as illustrated in FIG. 4, but also perform an additional stabilizing function similar to that of the first and second contact faces 106, 116.

The first and second clamping faces 108, 118 are those surfaces of the respective first and second portions 102, 112 of the fixture 100, which engage and pinch the web 14 when the fixture 100 is installed on the beam 12.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring particularly to FIGS. 2 and 4-7, in one aspect of the disclosure, which may include at least a portion of the subject matter of any of the preceding and/or following examples and aspects, the first contact face 106 includes a first number of contact portions 122 and the second contact face 116 includes a second number of contact portions 125. The first number of contact portions 122 is equal to the second number of contact portions 125, and the first number of contact portions 122 is equal to or greater than one.

In the example of FIG. 2, the first portion 102 includes two contact portions 122, the second portion 112 including two corresponding contact portions 125. A contact portion 122 is that portion of the contact face 106 or 116 along which contact is actually being made. Therefore, whereas the contact face 106 or 116 always exists, and is of unchanging configuration and geometry in any one contact face 106 or 116, the contact portion 122 or 125 is defined only when actual contact occurs. That is because a contact face 106 or 116, if utilized with a corresponding contact face 116 or 106 of different configuration, could contact the corresponding contact face 116 or 106 at portions thereof different from those of the depicted example. Accordingly, the contact portion 122 or 125 would change with the location or locations of actual contact, given the different configurations of the associated contact faces 106, 116.

In FIG. 3, the contact faces 106, 116 of both the first portion 102 and the second portion 112 are slightly crowned or rounded at their respective apices. In this example, contact would occur at one point on each pair of abutting contact portions 122, 125 (when the contact faces 106, 116 abut one another). Those skilled in the art will appreciate that, as used herein, points of contact refer to physical locations or spots, rather than entities having a position in space, but no extent. Stabilizing of the first portion 102 relative to the second portion 112 against teetering in two axes requires at least three spatially separated points of contact on the first and second portions 102, 112. Stabilizing relative to teetering in the third axis of a three dimensional orthogonal system is accomplished when the fixture 100 is positioned against the flat upper surface of the beam 12, the flat upper surface being provided in the example of FIG. 2 by the flange 16. Only two points of contact need be provided by the first and second contact faces 106, 116 in the example of FIG. 2 because the function of a third point of contact is provided by contact of the first and second clamping face 108, 118 with the web 14 when the fixture 100 is installed on the beam 12.

By contrast with the example of FIG. 3, wherein two points of contact would be established upon abutment of the contact faces 106, 116, contact may be made along a line of contact rather than at a point of contact. An example of a line of contact is illustrated in FIG. 5, wherein the apices of two crowned contact faces 106, 116 are parallel. These apices make continuous contact along a line (seen as contact portions 122, 125) when their respective contact faces 106, 116 are brought into mutual contact.

Referring to FIGS. 2, 5, and 6, in one aspect of the disclosure, which may include at least a portion of the subject matter of any of the preceding and/or following examples and aspects, the first contact portions 122, 125 of the contact faces 106 or 116 are one of linear, planar, or curved. The effective (mutually contacting) portions of the contact faces 122, 125 may be along a line (i.e., at the meeting of the apices of the contact faces 106, 116 shown in FIG. 5). Referring to FIG. 2, contact between first and second contact faces 106, 116 is made along the extent of two two-dimensional patches of contact between the first and second portions 102, 112. In FIG. 2, planar contact is made between a first tab 124 on the first portion 102 and a second tab 126 on the second portion 112, resulting in contact portions 122, 125, visible only along their respective edges in FIG. 2.

An example of curved two dimensional contact is illustrated in FIG. 6 by two complementary curved contact faces 106, 116 of respective first and second portions 102, 112 of the fixture 100 (not shown in its entirety), according to one aspect of the disclosure. In the example of FIG. 6, the contact faces 106, 116 are complementary, and make contact along substantially their full extents. In this example, each of the contact portions 122, 125 is coextensive with its associated contact face 106 or 116. The contact portions 122, 125 may be smaller than or equal to the associated contact faces 106, 116, but never greater.

A linear first contact portion 122 or 125 (e.g., in FIG. 5) potentially minimizes the degree of precision required in fabrication of the associated first and second portions 102, 112, in that it may not be necessary that the first contact portion 122 or 125 be at a particular location on its associated contact face 106 or 116. A planar first contact portion 122 or 125 (e.g., in FIG. 2) increases stability of contact compared to linear contact. If curved (e.g., in FIG. 6), the first contact portion 122 or 125 increases stability of contact compared to the planar first contact portions 122, 125 (i.e., the planar contact between the tabs 124, 126 in FIG. 2) due to greater area of contact along a given height.

FIG. 7 illustrates two contact portions 122 (and two corresponding contact portions 125) between the first and second contact faces 106, 116.

Referring to FIG. 4, the first clamping face 108 includes at least one clamping portion 138 and the second clamping face 118 includes at least one clamping portion 141. A clamping portion 138 or 141 is that portion of the respective clamping face 108 or 118 which makes contact with the beam 12. In the example of FIG. 4, the clamping portion 141 is coextensive with the clamping face 118. In other possible configurations (e.g., as illustrated in FIG. 11), the clamping portion 141 may be smaller than the clamping face 118. In the example of FIG. 3, the first portion 102 and the second portion 112 each includes two clamping faces 108 or 118. In the view of FIG. 3, one of the clamping faces 108 of the first portion 102 is concealed from view. Both of the clamping faces 118 of the second portion 112 are visible.

Referring again to FIG. 4, the number of points at which opposed clamping portions 138, 141 and opposed contact portions 122, 125 meet is at least three. Thus, at least three points of support are established to stabilize the first and second portions 102, 112 of the fixture 100.

The clamping faces 108 or 118 need not be planar, as illustrated in FIG. 4. Associated clamping portions 138, 141 may be linear, planar in two dimensions (if the clamping face 108 or 118 is planar, as illustrated in the example of FIG. 4), or planar in three dimensions. Turning to FIG. 11, a clamping face 118 and associated clamping portion 141 are planar, yet are distributed throughout three dimensions. The clamping faces 108, 118 and their associated clamping portions 138, 141 are two dimensional, and because they are curved, occupy three dimensions.

To accommodate normal alignment variations of the clamping face 118 (or 108) with the beam 12 that might occur due to manufacturing tolerances, for example, the actual area of contact of a clamping portion 138 or 141 may be smaller than its associated clamping face 108 or 118. This would ensue from, for example, curved clamping faces 108, 118 abutting the web 14, as illustrated in FIG. 11

In FIG. 13, the second portion 112 has a single clamping face 118 which spans the same lateral distance or dimension as the two separate contact faces 116. In the example of FIG. 13, the two contact faces 116 and the clamping face 118 collectively establish three points of contact when the second portion 112 abuts a corresponding first portion 102. This holds true even if the corresponding first portion 102 includes two clamping faces 108, as seen in FIG. 3.

Having at least three points of contact distributed between the first and second contact faces 106, 116 and between the first and second clamping faces 108, 118 promotes stability of contact between the first portion 102 and the second portion 112 when resting on the beam 12 and mutually abutting.

Referring to FIG. 1, but with particular reference to FIGS. 2 and 3, in one aspect of the disclosure, which may include at least a portion of the subject matter of any of the preceding and/or following examples and aspects, the fixture 100 includes means 137 for drawing the first portion 102 toward the second portion 112. The means 137 for drawing the first portion 102 toward the second portion 112 causes the fixture 100 to maintain its position surrounding and constraining the object 10 at a selected location on the beam 12. As used herein, the means 137 are to be interpreted under 35 U.S.C. 112(f), unless otherwise explicitly stated. It should be noted that examples provided herein of any structure, material, or act in support of any of the means-plus-function clauses, and equivalents thereof, may be utilized individually or in combination. Thus, while various structures, materials, or acts may be described in connection with a means-plus-function clause, any combination thereof or of their equivalents is contemplated in support of such means-plus-function clause.

Referring particularly to FIG. 2, in one aspect of the disclosure, which may include at least a portion of the subject matter of any of the preceding and/or following examples and aspects, the first portion 102 includes the first tab 124, and the second portion 112 includes the second tab 126. Referring also to FIG. 3, in one aspect of the disclosure, which may include at least a portion of the subject matter of any of the preceding and/or following examples and aspects, the first tab 124 includes a first hole 132 and the second tab 126 includes a second hole 134. The first and second tabs 124, 126 provide suitable locations for the first and second holes 132, 134. In turn, the first and second holes 132, 134 can receive the means 137, which in the example of FIG. 3 includes a clamp operable to draw the first portion 102 toward the second portion 112. An example of a suitable clamp is that of a pin 136 having a radially expansible portion. The pin 136 may be a Cleco fastener, a commercial product of the Cleveland Pneumatic Tool Company, of Cleveland, Ohio, currently in widespread use in aircraft repair and maintenance. In the example of FIG. 3, the means 137 for drawing the first portion 102 toward the second portion 112 includes the tab 124 and its associated hole 132, the tab 126 and its associated hole 134, and the pin 136.

As alternatives to the pin 136 and tabs 124, 126, the means 137 may include one or more threaded fasteners with or without a nut, an overcenter device, a spring arrangement without an associated pin such as the pin 136, a latch or other element incorporating a cam, one or more magnets, or a powered assembly, such as by electrical, hydraulic, or pneumatic power (none of these options is shown).

The means 137, depicted as a discrete or fully self-contained elements in FIG. 1, may include a second clamp or other device capable of drawing the first portion 102 toward the second portion 112. For example, the means 137 may include two pins 136, as shown in FIG. 3. The means 137 may include structure identical (although in mirror image arrangement, in the example of FIG. 3) to that of the means 137. Where provided as plural assemblies including the means 137, as illustrated in FIGS. 2 and 3, the various assemblies of the means 137 may be dissimilar. Providing the means 137 for drawing the first portion 102 toward the second portion 112 may assist in applying bilaterally symmetrical pulling forces on the fixture 100. Furthermore, the means 137 may facilitate a design such as that illustrated in FIG. 3, wherein the clamps such as the pin 136 are located to the side of the fixture 100, thereby leaving the upper surface of the fixture 100 available for additional features, as will be detailed hereinafter.

Referring to FIG. 10, in one aspect of the disclosure, which may include at least a portion of the subject matter of any of the preceding and/or following examples and aspects, when the fixture 100 is installed on the beam 12, a clearance fit exists between the object 10 and each of the first positioning face 104 and second positioning face 114. The clearance fit, indicated by a gap between the object 10 and each of the first and second positioning faces 104, 114, enables insertion of the object 10 into place within the assembled fixture 100 after the latter has been installed on the beam 12, and also protects the object 10 from potentially distorting forces which could arise from the fixture 100 if the fixture 100 were to actively clamp the object 10.

Referring to FIG. 3, in one aspect of the disclosure, which may include at least a portion of the subject matter of any of the preceding and/or following examples and aspects, at least a portion of at least one of the first positioning face 104 or the second positioning face 114 is concave. A concavity forms a receptacle configured to receive cylindrical objects 10 in close cooperation therewith.

Referring now to FIG. 8, in one aspect of the disclosure, which may include at least a portion of the subject matter of any of the preceding and/or following examples and aspects, at least a portion of at least one of the first positioning face 104 or the second positioning face 114 is convex. The first portion 102 includes the positioning face 104 and associated convexities 143. The convexities 143 may reduce demands for precision of fabrication of the first and second portions 102, 112 since contact need occur only at points or lines of contact, rather than along a surface, and may also facilitate engaging objects 10 (see FIG. 3) of irregular outer shapes and configurations (not shown).

Referring again to FIG. 3, in one aspect of the disclosure, which may include at least a portion of the subject matter of any of the preceding and/or following examples and aspects, at least one of the first clamping face 108 or the second clamping face 118 includes a slip-resistant treatment 135. When the fixture 100 is installed on the beam 12, the slip-resistant treatment 135 opposes unintended slippage of the fixture 100 along the beam 12, thereby maintaining the object 10 in the selected location. The slip-resistant treatment 135 may be two sided adhesive tape. Alternatively, the slip-resistant treatment 135 could be a layer of adhesive applied directly to the contact surface of the clamping faces 108 or 118, an elastomeric coating having friction characteristics similar to those of adhesive tape, applied to the contact surface, texturing (e.g., tread patterns, etc.) applied to the contact surface, etc. (these options are not shown). As a further alternative, the first portion 102 or the second portion 112 or both could be formed fully or partially from a material, such as rubber and rubber-like synthetic materials, displaying inherent friction characteristics which oppose sliding of the fixture 100 along the beam 12.

Referring to FIG. 2, in one aspect of the disclosure, which may include at least a portion of the subject matter of any of the preceding and/or following examples and aspects, the fixture 100 includes a visual warning indicator 140 on at least one of the first portion 102 or the second portion 112. The visual warning indicator 140 may include indicia, such as the legend "Remove". The visual warning indicator 140 serves as a reminder to remove the fixture 100 from the assembly which includes the beam 12. The fixture 100 may be a temporary measure for locating the object 10 while construction and other operations proceed, and may be unnecessary or even undesirable in the finished structure. Alternatively or in addition, any part of the fixture 100 could include a bright or colorful surface which visually clashes with surface characteristics of the beam 12 or of the object 10, thereby serving as the reminder by virtue of conspicuousness. The bright or colorful surface may entirely cover its associated surface, or may comprise a pattern on the associated surface.

In one aspect of the disclosure, which may include at least a portion of the subject matter of any of the preceding and/or following examples and aspects, when the fixture 100 is installed on the beam 12, the first positioning face 104 and the second positioning face 114 delimit a cavity 18 therebetween. Turning to FIG. 4, the fixture 100 also includes a cover 142 sized to overlap the cavity 18. The cavity 18 receives the object 10. The cover 142 protects the object 10 from incidental contact and potential damage in the course of construction.

In one aspect of the disclosure, which may include at least a portion of the subject matter of any of the preceding and/or following examples and aspects, the cover 142 is attachable to one of the first portion 102 and the second portion 112, for example, by bolts 144. This arrangement affords access to the object 10 or the cavity 18, for inspection, replacement, or service, etc., without removing the fixture 100 from the beam 12.

Referring to FIG. 9, in one aspect of the disclosure, which may include at least a portion of the subject matter of any of the preceding and/or following examples and aspects, the cover 142 is monolithic with one of the first portion 102 and the second portion 112. Monolithic construction eliminates the cover 142 as a separate component, and overcomes the possibility that the cover 142 (if not monolithic with the first portion 102 or the second portion 112) or the bolts 144 will be lost or misplaced.

Referring to FIGS. 4 and 9, in one aspect of the disclosure, which may include at least a portion of the subject matter of any of the preceding and/or following examples and aspects, the cover 142 includes at least one ventilation channel 146. Bonding of the object 10 to the beam 12, where a curable bonding agent such as a liquid adhesive or epoxy is used, may be expedited by ventilating the cavity 18, especially with heated air.

Referring specifically to FIG. 4, in one aspect of the disclosure, which may include at least a portion of the subject matter of any of the preceding and/or following examples and aspects, at least one of the first portion 102 or the second portion 112 includes at least one ventilation channel 146. Ventilation channels 146 located in the first or second portions 102, 112 may increase cross sectional area for ventilating, and may also enable a source of ventilation (not shown) to act on the fixture 100 laterally, rather than encumbering the upper surface thereof.

In one aspect of the disclosure, which may include at least a portion of the subject matter of any of the preceding and/or following examples and aspects, wherein the beam 12 includes the flange 16, the first portion 102 includes a first relief recess 148 including a first wall surface 150, and the second portion 112 includes a second relief recess 152 including a second wall surface 154. When the fixture 100 is installed on the beam 12, the first wall surface 150 is not in contact with the flange 16 and the second wall surface 154 is not in contact with the flange 16. The first and second wall surfaces 150, 154 are those surfaces of the respective first and second relief recesses 148, 152 which are substantially vertical as depicted in FIGS. 10 and 11. The first and second relief recesses 148, 152 are larger than the flange 16, thereby being able to pass the flange 16 through the first and second relief recesses 148, 152 without imposing distorting forces on or marring the flange 16.

In one aspect of the disclosure, which may include at least a portion of the subject matter of any of the preceding and/or following examples and aspects, the first relief recess 148 is located between the first positioning face 104 and the first clamping face 108, and the second relief recess 152 is located between the second positioning face 114 and the second clamping face 118. This configuration enables the first and second portions 102, 112 to interfit closely with the beam 12 having the flange 16 projecting perpendicularly from the web 14, such as an I-beam or an H-beam.

Referring now to FIGS. 10 and 11, in one aspect of the disclosure, which may include at least a portion of the subject matter of any of the preceding and/or following examples and aspects, the first portion 102 includes a first relief feature 156 between the first wall surface 150 and the first positioning face 104, and the second portion 112 includes a second relief feature 158 between the second wall surface 154 and the second positioning face 114. The first and second relief features 156, 158 provide an expansion space for a bead 159 of adhesive or epoxy which could migrate from between the object 10 and the beam 12 when the object 10 is fixed to the beam 12.

In one aspect of the disclosure, which may include at least a portion of the subject matter of any of the preceding and/or following examples and aspects, each of the first relief feature 156 and the second relief feature 158 is one of a chamfer 160 (FIG. 10) or a counterbore 162 (FIG. 11). The chamfer 160 may be machined into a die (not shown) for molding the first and second portions 102, 112, or may be machined into the first and second portions 102 or 112 if not originally formed with the first or second relief feature 156 or 158. The counterbore 162 increases the volume available to receive the bead 159, compared to the volume of the chamfer 160.

Referring generally to FIGS. 1-13, and with particular reference to FIG. 14, one example of the present disclosure relates to a method 200 of assembling a structure using the fixture 100 comprising the first portion 102 and the second portion 112. The structure includes the object 10 and the beam 12 that also includes the web 14. The method 200 includes installing the fixture 100 on the beam 12 by gripping the beam 12 between the first clamping face 108 of the first portion 102 and the second clamping face 118 of the second portion 112 (block 202), and positioning the object 10 relative to the beam 12 between the first positioning face 104 of the first portion 102 and the second positioning face 114 of the second portion 112 without gripping the object 10 (block 204). The object 10 may thus be immobilized at a selected location along the beam 12 and bonded in place, for example.

In one aspect of the disclosure, which may include at least a portion of the subject matter of any of the preceding and/or following examples and aspects, the beam 12 includes the flange 16 projecting from the web 14. Installing the fixture 100 on the beam 12 includes locating the flange 16 between the first relief recess 148 formed in the first portion 102 and the second relief recess 152 formed in the second portion 112 to avoid contact between the flange 16 and the fixture 100 (block 206). Some incidental contact of the flange 16 and the fixture 100 may occur. However, because of a gap which exists between the flange 16 and the fixture 100 due to dimensions of the first and second relief recesses 148, 152, no injurious pressure is exerted on the flange 16. The flange 16 is thereby not marred by the fixture 100.

In one aspect of the disclosure, which may include at least a portion of the subject matter of any of the preceding and/or following examples and aspects, the method 200 includes forming an adhesive bond between the object 10 and the beam 12 (block 208). The adhesive bond avoids drilling and other invasive methods which could damage the beam 12. This is particularly significant in structures such as an aircraft 1102 (see FIG. 15), wherein the beam 12 may be of a composite material particularly susceptible to damage.

In one aspect of the disclosure, which may include at least a portion of the subject matter of any of the preceding and/or following examples and aspects, forming the adhesive bond between the object 10 and the beam 12 includes applying to the object 10 at least one of heat or air flow through the fixture 100 (block 210). Heat and air flow, obtained from an industrial air blower incorporating heating elements (not shown), for example, expedite curing of adhesives and epoxies.

Referring also to FIG. 15, in one aspect of the disclosure, which may include at least a portion of the subject matter of any of the preceding and/or following examples and aspects, the method 200 includes resting at least a portion of a temporary platform 19 on the fixture 100 at least while the adhesive bond is being formed (block 212). The temporary platform enables assembly operations to be performed while the bond securing the object 10 to the beam 12 cures. This may be desirable in maintaining a construction schedule in large and expensive structures such as the aircraft 1102.

Referring also to FIG. 16, in one aspect of the disclosure, which may include at least a portion of the subject matter of any of the preceding and/or following examples and aspects, the method 200 includes resting at least one of a movable or a stationary load 20 on the temporary platform 19 (block 214). Accommodation of movable and stationary loads permits work materials, tools, personnel, and diverse equipment (none shown) to be stored and used where the object 10 may be curing, thereby further facilitating ongoing assembly operations to the structure while the object 10 bonds to the beam 12.

In one aspect of the disclosure, which may include at least a portion of the subject matter of any of the preceding and/or following examples and aspects, the method 200 includes removing the temporary platform 19 (block 216); removing the fixture 100 from the beam 12 after the adhesive bond has been formed (block 218); resting at least a portion of a final platform 22 on the fixture 100 (block 220); and coupling the final platform 22 to the structure at a component 24 of the structure other than the beam 12 (block 222). Removing the temporary platform 19 and the fixture 100 from the beam 12, and coupling the final platform 22 to the structure enable final assembly to be performed. Coupling the final platform 22 at the component 24 other than the beam 12 enables the final platform 22 to enjoy support from the beam 12 by resting the final platform 22 on the object 10, but without bonding the final platform 22 to the object 10. This may prevent the object 10 from being dislodged from the beam 12, while still accommodating weight borne by the final platform 22.

In one aspect of the disclosure, which may include at least a portion of the subject matter of any of the preceding and/or following examples and aspects, the method 200 includes isolating the object 10 from an external force applied along an axis passing through the object 10 (block 224). Isolating or shielding the object 10 from external forces may be performed by surrounding the object 10 with the fixture 100. The cover 142 may be used to shield the object 10 from contact from above. This protects the object 10 from being dislodged or damaged in the course of construction or assembly of the structure.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 17 and the aircraft 1102 as shown in FIG. 18. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, the aircraft 1102 produced by the illustrative method 1100 may include an airframe 1118 with a plurality of high-level systems 1120 and an interior 1122. Examples of high-level systems 1120 include one or more of a propulsion system 1124, an electrical system 1126, a hydraulic system 1128, and an environmental system 1130. Any number of other systems may be included. The final platform alluded to above may be a floor of a passenger compartment of the aircraft 1102. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method of assembling a structure using a fixture, the fixture comprising a first portion and a second portion, the structure comprising an object and a beam that includes a web, the method comprising steps of:
    installing the fixture on the beam by gripping the beam between a first clamping face of the first portion and a second clamping face of the second portion so that:
        a first contact face of the first portion and a second contact face of the second portion abut each other, and
        the first clamping face and the second clamping face engage the web;
    positioning the object relative to the beam between a first positioning face of the first portion and a second positioning face of the second portion without gripping the object; and
    installing a fastener, orthogonal to a first tab and a second tab, wherein:
        the first tab is connected to the first portion,
        the second tab is connected to the second portion, and
        installing the fastener draws the first portion toward the second portion by drawing the first tab toward the second tab.

2. The method claim 1, wherein:
the step of installing the fixture on the beam further comprises locating a flange; and
the flange projects from the web between a first relief recesses, formed in the first portion, and a second relief recess, formed in the second portion, to avoid contact between the flange and the fixture.

3. The method of claim 1, further comprising a step of forming an adhesive bond between the object and the beam.

4. The method of claim 3, wherein the step of forming the adhesive bond between the object and the beam further comprises applying to the object at least one of heat or air flow through the fixture.

5. The method of claim 4, further comprising resting at least a portion of a temporary platform on the fixture at least while the adhesive bond is being formed.

6. The method of claim 5, further comprising resting at least one of a movable or a stationary load on the temporary platform.

7. The method of claim 5, further comprising:
removing the temporary platform;
removing the fixture from the beam after the adhesive bond has been formed;
resting at least a portion of a final platform on the fixture; and
coupling the final platform to the structure.

8. The method of claim 1, further comprising a step of isolating the object from an external force applied along an axis passing through the object.

9. The method of claim 8, wherein the step of isolating the object from the external force comprises a step of surrounding the object with the fixture.

10. The method of claim 9, wherein the step of surrounding the object with the fixture comprises installing a cover to shield the object from contact.

11. The method of claim 1, wherein the beam comprises a composite material.

12. The method of claim 1, wherein:
the first contact face comprises a first number of contact portions;
the second contact face comprises a second number of contact portions;
the first number of contact portions is equal to the second number of contact portions; and
the first number of contact portions is equal to or greater than one.

13. The method of claim 1, wherein the first contact face is one of linear, planar, or curved.

14. The method of claim 1, wherein:
with the fixture installed on the beam, the first positioning face and the second positioning face delimit a cavity therebetween; and
the fixture further comprises a cover, sized to overlap the cavity.

15. The method of claim 14, wherein the cover is attachable to one of the first portion and the second portion.

16. The method of claim 14, wherein the cover is monolithic with one of the first portion and the second portion.

17. The method claim 14, wherein the cover comprises at least one ventilation channel.

18. The method of claim 1, wherein at least one of the first portion or the second portion further comprises at least one ventilation channel.

19. The method of claim 1, wherein at least a portion of at least one of the first positioning face or the second positioning face is concave.

20. The method of claim 1, wherein at least one of the first clamping face or the second clamping face includes a slip-resistant treatment.

\* \* \* \* \*